US000001496H

United States Statutory Invention Registration [19]

[11] Reg. Number: H1496

Marshall

[45] Published: Oct. 3, 1995

[54] AUDIO AND INFRARED COLLECTION OF SPEECH RECOGNITION DATA

[75] Inventor: Patrick T. Marshall, Beavercreek, Ohio

[73] Assignee: The United States of America as represented by the Secretary of the Air Force, Washington, D.C.

[21] Appl. No.: 86,576

[22] Filed: Jul. 6, 1993

[51] Int. Cl.[6] ..... G10L 5/06

[52] U.S. Cl. ..... 381/43; 381/41; 395/2

[58] Field of Search ..... 395/2; 381/41, 381/42, 43; 250/338.1; 430/944

[56] References Cited

U.S. PATENT DOCUMENTS

| | | | |
|---|---|---|---|
| 3,192,321 | 6/1965 | Nassimbene | 381/41 |
| 4,437,002 | 3/1984 | Taniguchi et al. | 250/338.3 |
| 4,757,541 | 7/1988 | Beadles | 381/43 |
| 4,769,845 | 9/1988 | Nakamura | 381/43 |
| 4,961,177 | 10/1990 | Uehara | 367/197 |
| 5,153,560 | 10/1992 | Ichikawa | 340/522 |

OTHER PUBLICATIONS

Integrated Modelling of Thermal and Visual Image Generations Oh et al. IEEE 4–8 Jun. 1989 pp. 356–362.

Neural Net Lipreading System for Improved Speech Recognition Stork et al. IEEE 7–11 Jun. 1992, pp. 285–295.

Peripheral Vision Lipreading Aid Ebrahimi et al IEEE Oct. 1991, pp. 944–952.

Integrated Analysis of Thermal and Visual Images for Scene Interpretation. Nandhakumar, IEEE Jul. 4, 1988.

Proceedings of Speech '85, Automatic Lipreading to Enhance Speech Recognition Eric D. Petajan, AT&T Bell Laboratories., Jun. 19–23, 1985, San Francisco Calif. IEEE Computer Society Conference on Computer Vision & Pattern Recognition.

Proceedings of Speech '88, A Multi–Channel Physiological Data Acquisition System Based on an IBM PC, and Its Application to Speech Therapy, 7th Fase Symposium, Edinburgh, IBM UK Scientific Centre and Department of Linquistic Science.

*Primary Examiner*—Bernarr E. Gregory

*Attorney, Agent, or Firm*—Gerald B. Hollins; Thomas L. Kundert

[57] ABSTRACT

A data collection arrangement for an automatic speech recognition system wherein both a voice related audio signal and a mouth, tongue, and lip movement related video signal are collected from a user-speaker. The mouth and lip related photo signal of the present invention is derived from user body heat-sourced infrared energy radiation in the far infrared spectral region by a way of a thermal sensor disposed before the mouth and lip region of the user speaker.

11 Claims, 2 Drawing Sheets

AUDIO AND INFRARED COLLECTION OF SPEECH RECOGNITION DATA

RIGHTS OF THE GOVERNMENT

The invention described herein may be manufactured and used by or for the Government of the United States for all governmental purposes without the payment of any royalty.

BACKGROUND OF THE INVENTION

This invention relates to the field of human speech recognition and to the collection of both audio or vocal sound information and lip movement information pertaining to such recognition.

According to the invention this lip movement data collection is accomplished via infrared energy emanating from the user's mouth and facial regions.

Although isolated word use of speech recognition has achieved some degree of success in the industrial and other controlled and limited vocabulary environments, the recognition of continuous human speech in a voice-to-printed page conversion sequence has progressed at a limited and halting pace. Principally, this limitation has occurred because of a lack of accuracy in performing the speech recognition function and to a lesser degree because of the cost and complexity of the systems achieving the best results in this work area.

Most reported efforts heretofore have concentrated on the realization and/or implementation of special algorithms which are directed to the audio and spoken sound collection of input data.

These efforts have, to a large degree, ignored the commonly practiced, especially by deaf people, phenomenon of lip reading or lip and mouth movement sensing as an additional and confirming/complimenting source of information for a recognition system. The present invention and the companion inventions identified in the incorporated by reference material below are believed to provide valuable arrangements for collecting these dual-channel, that is audio and photo or lip movement responsive, speech recognition data input signals.

The patent art of interest with respect to the present invention includes U.S. Pat. No. 4,769,845 issued to H. Nakamura, concerned with a lip image speech recognition apparatus which employs a camera device in order to achieve data input. The non-camera or integrated signal pickup arrangement of the present invention is distinguished over this camera input characteristic of the Nakamura patent.

Also included in this patent art of interest is U.S. Pat. No. 4,757,541 issued to R. L. Beadles, a patent concerned with an audio visual speech recognitions system in which an optical scanning or a non-integrated signal is employed.

Of additional interest, with respect to the invention is U.S. Pat. No. 4,961,177 which discloses a method and apparatus for inputting a voice through a microphone and in which a camera system is used to keep the microphone located in an appropriate position with respect to a human speaker.

None of these prior patents, therefore, is concerned with the infrared energy based collection of lip and mouth movement data for use with an audio signal data channel in a speech recognition system.

SUMMARY OF THE INVENTION

In the present invention, the far infrared spectral region energy emitted by the body temperature of a user speaker, an energy pattern contrasted by the speakers surrounding cooler mouth areas, is employed for the purpose of detecting lip, tongue, and mouth area movements of the speaker's face. This movement related photo signal information is also accompanied by microphone, originated audio information relating to the same spoken sound of the photo information.

It is therefore an object of the present invention to provide a passive or non-energy-requiring lip, mouth and tongue movement sensing system for use in the speech recognition art.

It is also an object of the present invention to provide a lip and mouth movement sensing arrangement that is small in size and weight and thereby susceptible of boom mounting or other convenient suspension arrangements before the face of a system user.

It is another object of the invention to provide a speech recognition lip and mouth movement sensing arrangement that is responsive to the differing body temperatures within and around the mouth regions of a human user subject.

It is another object of the invention to provide a lip and mouth movement sensing arrangement in which the output signal occurs only during facial movement events.

Additional objects and features of the invention will be understood from the following descriptions, claims and accompanying drawings.

These and other objects of the invention are achieved by a bichannel, lip modulated infrared energy responsive, and spoken sound responsive human speech recognition data collection apparatus comprising the combination of; user head mounted microphone transducer means disposed adjacent lip and mouth cavity facial regions of a human user subject for generating a spoken sound electrical signal responsive to speech sounds generated by said human user subject; infrared energy to electrical signal detector means disposed adjacent said microphone transducer member for generating, from changing infrared spectrum energy radiated by body temperature heat of said human user's lip and mouth cavity facial regions, a lip movement responsive electrical signal of correlated relationship with said spoken sound electrical signal; said infrared energy to electrical signal detector means including a broadband optical frequency spectrum to electrical signal thermal energy transducer operating exclusive of a photon counting operating mode; audio frequency amplifier circuit means connected with microphone transducer means for amplifying said spoken sound electrical signal; bandpass amplifier circuit means connected with said infrared to electrical signal transducer means for amplifying selected frequency spectrum portions of said lip movement responsive electrical signal.

DETAILED DESCRIPTION

In addition to the two below incorporated-by-reference copending of my patent applications, additional information concerning the present invention is also to be found in my technical academic thesis titled "Speech Recognition Using Visible and Infrared Detectors" which was presented to the faculty of the School of Engineering of the Air Force Institute of Technology of the Air University in partial fulfillment of the requirement for the degree of Master of Science in Electrical Engineering and dated September 1992. Copies of this thesis may be obtained from the Air Force Institute of Technology at Wright-Patterson Air Force Base, Ohio 45433 and may also be obtained from the Defense Technical Information Center (DTIC) of Cameron Station, Alexandria, Va. 22304-6145 under the DTIC identification number of AD-A262490. The DTIC copies of my thesis carry a "Selection Date" of 5 Apr. 1993; and the thesis is approved for public release with unlimited distribution. The contents of this academic thesis are also hereby incorporated by reference herein. One copy of this academic thesis in printed media format is supplied along with the present application papers to the U.S. Patent and Trademark Office for use with any one of the three of my present common file-date patent applications. In addition, microfiche copies of this thesis are being sought for supplying to the Patent and Trademark Office during prosecution of the three patent applications.

Some additional information regarding the present invention data collection apparatus is to be found in my copending, and filed of even filing date herewith, patent applications identified as U.S. Pat. Ser. No. 08/086,577 and U.S. Pat. Ser. No. 08/086,578 which are concerned with audio and amplitude modulated photo data collection for speech recognition and dual-channel collection and use of speech correction signals, respectively. The disclosure of these two copending patent applications is hereby incorporated by reference into the present specification.

Figure 1:
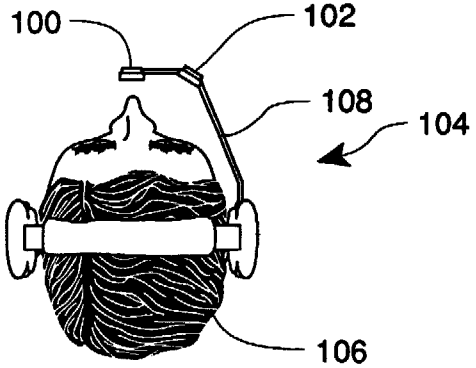
FIG. 1 shows a data collection headset arrangement according to the invention.

FIG. 1 in the drawings shows an overhead perspective view of a speech recognition data collection apparatus 104 in accordance with the present invention. In the following descriptive material the term "Figure" and the term "FIG." are used interchangeably in referring to the FIG. 1 and other drawings. In the FIG. 1 drawing, a user or speaker 106 is shown to be provided with a headset 108 a type that is normally used in telephone and other hands free work situations; the headset 108 is suspended from the users head in a manner known in the art.

A sound responsive microphone 102 is shown to be suspended from the boom portion of the headset 108, in a location slightly off center of the mouth and lip region of the user's face, where the microphone is exposed to spoken sounds originating in the user's mouth. Centrally located before the user's mouth and lip region and suspended from the headset 108 is a photo signal pickup array 100 which according to the present invention, is responsive to far infrared spectral region thermal emissions emanating from the lip and mouth cavity regions of the user 106. This exclusively infrared responsive nature of the photo pickup signal array 100 is a particularly distinguishing feature of the present invention with respect to the inventions discussed in my above incorporated by-reference copending patent applications.

Figure 2:
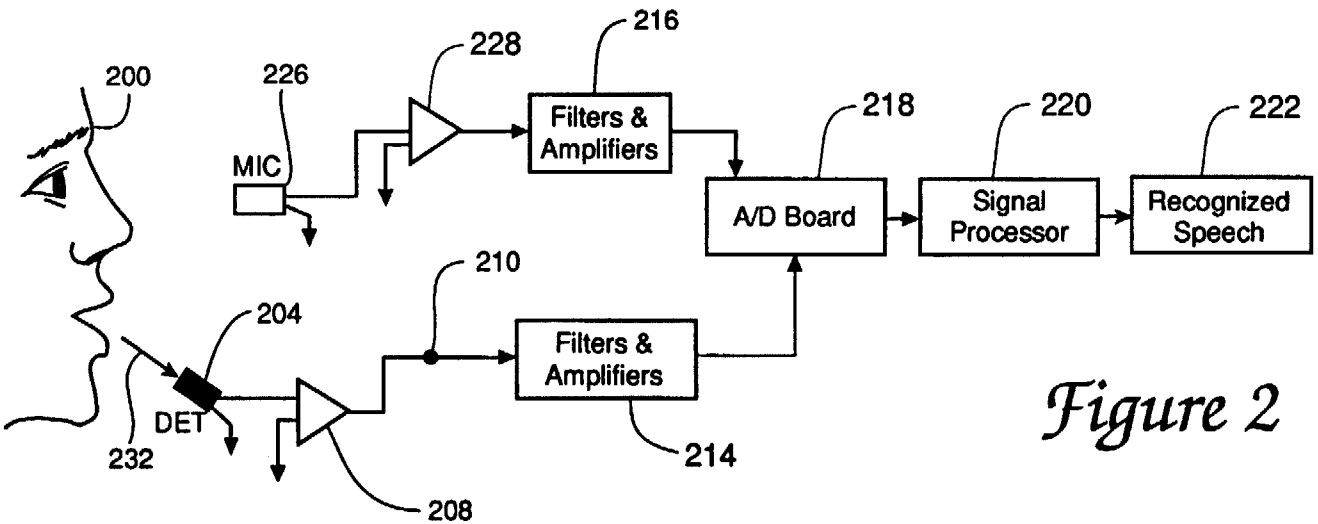
FIG. 2 shows a block diagram of a data collection and data processing apparatus for a speech recognition system.

FIG. 2 of the drawings shows a block diagram representation of signal processing apparatus as may be used with the combined photo and audio pickup apparatus 104 of FIG. 1. In the FIG. 2 block diagram the microphone 102 is represented at 226 and signals from this microphone are coupled to a preamplifier circuit 228. The output of the preamplifier is connected to the filter and amplifying circuitry 216. Signal from this filter and amplifier 216 are coupled to the analog to digital converter board 218 for communication to the signal processor or computer 220.

Figure 4:
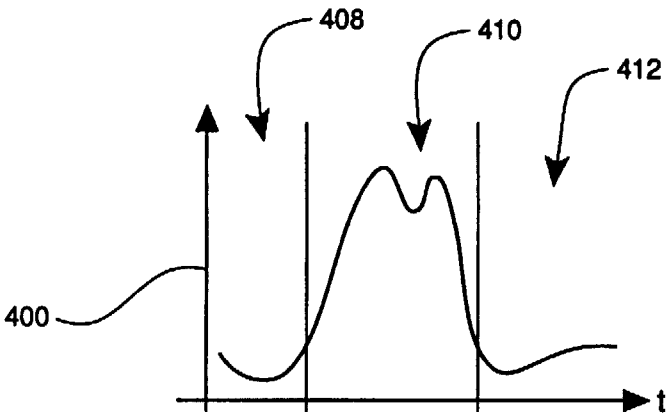
FIG. 4 shows a photo signal diagram for the FIG. 2 apparatus.

Infrared energy sourced video information travels along the lower path in the FIG. 2 diagram and originates with the infrared radiation flowing along the path 232 between the user's lip and mouth region and the infrared detector element 204. The electrical signal output of this infrared detector is applied to the preamplifier 208 and then to the filter and amplifier circuits of the block 214. A signal waveform characteristic of the signals communicated along the path between the preamplifier 208 and the filter and amplifier of block 214 is shown in FIG. 4 of the drawings.

Photo signal from the filter and amplifier block 214 is also applied to the analog to digital converter circuit of the block 218 and then communicated to the signal processor or computer 220 where processing to accomplish speech recognition is performed and a recognized speech signal generated as is indicated in the block 222.

The signal processing of the block 220 in FIG. 2 may be accomplished with either hardware or software implemented algorithms which are known and commercially available in the present day electronics market place. Among the functions to be accomplished in the block 220 are the following items.

1. An interface with the analog to digital conversion circuitry of the block 218.

2. A location of word boundaries in both the audio and infrared signals.

3. A transformation of the audio word into energy distribution format is preferred for assistance in this word location.

4. A comparison between word boundaries to verify word endpoints.

5. Word segmentation.

6. The audio word is processed to obtain frequency spectrum and zero crossing information.

7. Normalization of both audio and photo words.

8. A comparison of audio and visual words to their respective ideal word template data using a standard dynamic time warping algorithm.

9. A result comparison between the two types of word decision and an election of the most probable word identity.

Figure 3:
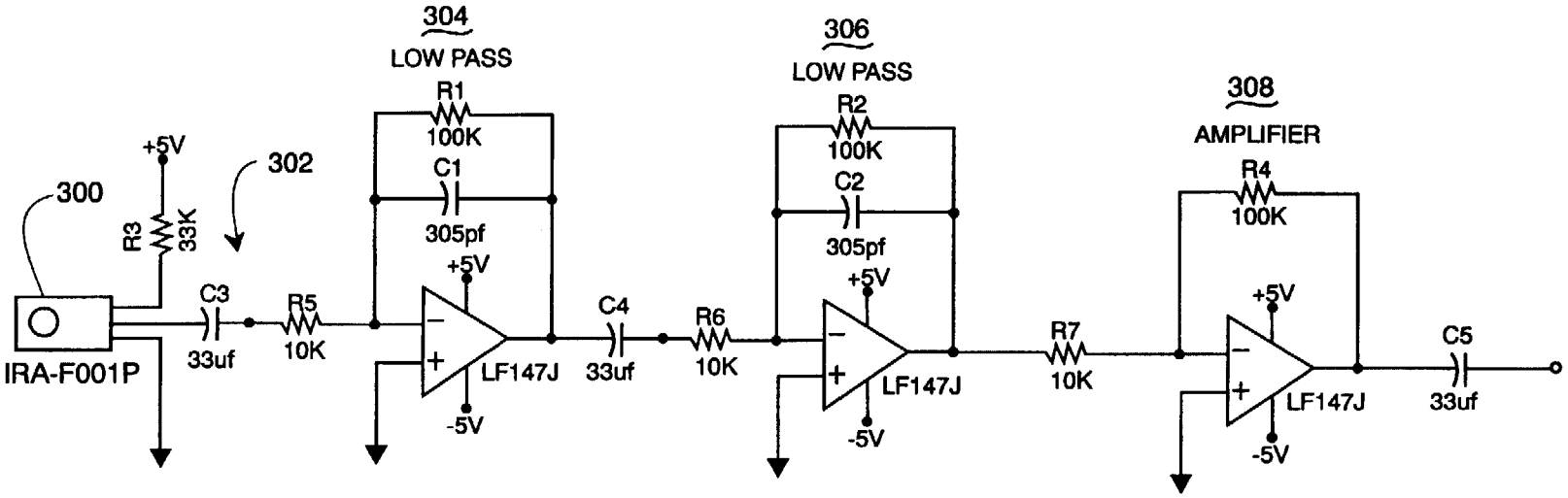
FIG. 3 shows a schematic diagram of an amplifier and filter circuit usable with the present invention.
Figure 5:
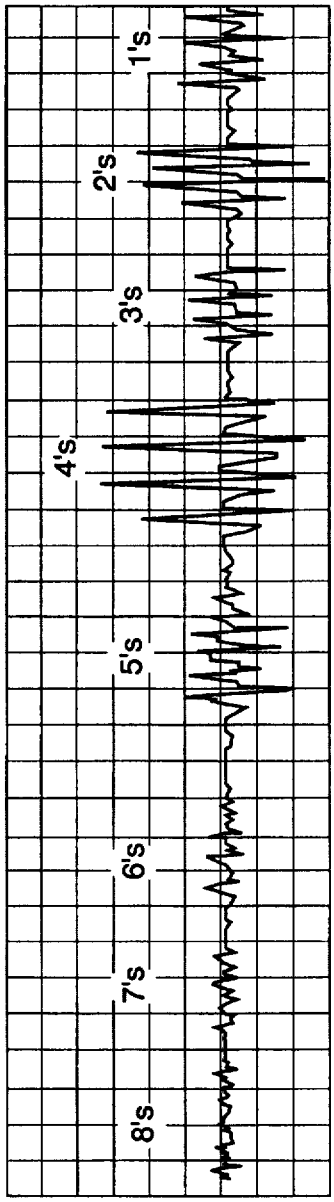
FIG. 5 shows the output of a thermal sensor of the invention during enunciation of several number identities.

FIG. 3 in drawings shows the electrical circuitry comprising the elements 204, 208 and 214 in the FIG. 2 drawing in electrical schematic form. In the FIG. 3 drawing the infrared energy sensor is shown at 300 along with the identification coding used for a preferred embodiment of this sensor. As is disclosed in my above incorporated by reference thesis, the IRA-F001P electrical detector as described in product catalog AS01E-5 of muRata (sic) ERIE North America, of Smyrna, Ga. has been found to be particularly effective for use in the present invention. The IRA-F001P detector employs crystal polarization changes to sense temperature differentials or infrared energy incidence.

A notable trait of the IR-F001P detector is its characteristic of providing an output signal only upon sensing a change in temperature. As may be observed in the FIG. 3 diagram the IRA-F001P infrared sensor is disposed in the form of a field effect transistor having a drain, a source and earth (presumably gate) electrical terminals which connect respectfully to the plus five volt supply, to the signal coupling path 302, and to a ground terminal.

Other forms of infrared signal detectors may be employed in the present invention apparatus including detectors which employ the concept of a infrared responsive photodiode, a thermistor, a thermopile resistance responsive device; an infrared responsive diode with a visible light filter may also be used for the detector 300 in FIG. 3. The nonphoton responsive types of detectors such as the crystal polarization detector described above are preferred for use in the present invention.

The infrared signal received by the detector 300 preferably originates from the contrasting temperatures of the lip and mouth interior portions of the user subject 106 and is based on the concept of the users mouth interior being at a warmer temperature near 98.6 degrees F. in comparison with exposed and cooled lip region of the user's face. The spectral locations of this mouth interior and lip region sourced information is found to reside at approximately the nine micrometer wavelength far infrared region of the electromagnetic spectrum.

Preferably the sensor 300 is disposed at a distance between 0.5 and 0.7 inches from the lip and mouth cavity facial regions of the user 106. In this position a field of view covering the widest expected mouth opening of about 1 inch is achieved. Since the human mouth facial region is found to move at frequencies of 25 hertz and below the response time of the preferred crystal polarization detector is adequate for the present invention. The frequency response time of the above mentioned other thermal detector arrangements such as a thermocouple or a thermistor requires some consideration of this 25 hertz frequency of movement, however. A waveform representation of the output of the sensor 300 during pronunciation of the words eights, sevens, sixes, and so on, is shown in my above identified academic thesis.

The electrical signal output of the IRA-F001P sensor at 300 in FIG. 3 is communicated along the AC coupled path 302 to the operational amplifier circuit 304 which is connected in the form of a low-pass filter. This low-pass filter is of a one-pole, gain of ten, and corner frequency of 5.2 kilohertz character and receives signal from the sensor 300 at a summing node terminal.

The output of this low-pass filter amplifier is connected to a second low-pass filter amplifier of identical configuration with the amplifier 304, as is shown at 306 in the FIG. 3 drawings. The output of the two low-pass filter amplifiers 304 and 306 is further amplified in the flat frequency response, amplifier shown at 308 in FIG. 3 in order to provide the electrical signal applied to the analog to digital converter circuit of the block 218 in FIG. 2.

FIG. 4 in the drawings shows the nature of signals exsisting at the node 210 in FIG. 2, that is, signals coupled between the preamplifier 208 and the filter and amplifier circuit 214. The FIG. 4 waveforms are shown on the coordinate axis set 400 of voltage in the vertical direction and time in the horizontal direction with the waveform in the portion 408 and 412 representing a mouth closed condition, and the waveform at 410 representing a mouth opened condition.

The present invention use of infrared energy sensing is believed improved over a visible light detection arrangement for automatic speech recognition in that visible light detectors are susceptable to external lighting influences such as the sun, and office lighting, however the present infrared detector is arranged to be responsive only to the infrared energy emissions originating in the speaker's normal body temperature. The availability in the present invention of both an infrared source signal and a correlated audio signal from a user or speaker offers significantly increased information for use in the processing of a word recognition system and thereby enhances the prospect for reliable and accurate speech recognition.

While the apparatus and method herein described constitute a preferred embodiment of the invention, it is to be understood that the invention is not limited to this precise form of apparatus or method and that changes may be made therein without departing from the scope of the invention which is defined in the appended claims.

I claim:

1. Bichannel, lip modulated, body temperature heat infrared energy responsive, and spoken sound responsive human speech recognition data collection apparatus comprising a combination of:

user head mounted microphone transducer means for generating a spoken sound electrical signal responsive to speech sounds generated by said human user subject;

infrared energy to electrical signal detector means for generating from changing infrared spectrum energy radiated by body temperature heat of said human user's lip and mouth cavity facial regions, a lip movement responsive electrical signal of correlated relationship with said microphone transducer means spoken sound electrical signal;

said infrared energy to electrical signal detector means including a broadband optical frequency spectrum to electrical signal thermal energy transducer operating exclusive of a photon counting operating mode;

audio frequency amplifier circuit means connected with microphone transducer means for amplifying said spoken sound electrical signal;

bandpass amplifier circuit means connected with said infrared to electrical signal transducer means for amplifying selected frequency spectrum portions of said lip movement responsive electrical signal.

2. The apparatus of claim 1 wherein said infrared energy to electrical signal transducer means includes a pyroelectric crystal polarization detector element having an electrical output signal that is present in response to temperature change and absent in response to constant input temperature.

3. The apparatus of claim 2 wherein said pyroelectric crystal polarization detector is responsive to a field of view which includes a one inch vertical opening movement of said human user subject mouth cavity.

4. The apparatus of claim 3 wherein said pyroelectric crystal polarization detector has an angular field of view of eighty degrees and is disposed at a distance of 0.5 to 0.7 inches from said lip and mouth cavity facial regions of said human user-subject.

5. The apparatus of claim 2 wherein said pyroelectric crystal polarization detector has a field of view which includes both higher temperature mouth interior portions of said human user-subject and lower temperature atmospheric exposed lip portions of said human user subject during generation of said speech sounds by said human user-subject.

6. The apparatus of claim 2 wherein said pyroelectric crystal polarization detector has a spectral response band inclusive of infrared energy emitted by human flesh tissue maintained at a temperature of ninety eight and six tenths degrees Farenheit.

7. The apparatus of claim 2 wherein said pyroelectric crystal polarization detector has a thermal response band which includes the far infrared spectral region.

8. The apparatus of claim 1 wherein said bandpass amplifier circuit includes a frequency pass band of between one half Hertz and five thousand seven hundred Hertz.

9. The apparatus of claim 1 wherein said bandpass amplifier has a frequency bandpass which includes an upper pass frequency at least twice a twenty-five Hertz expected upper movement frequency of the human lip and mouth cavity facial regions of said human user-subject.

10. The apparatus of claim 1 wherein said infrared energy to electrical signal detector means includes an optical to electrical signal transducer element taken from the group consisting of a resistance temperature detector, a thermocouple, a thermistor, and a pyroelectric crystal polarization detector.

11. The apparatus of claim 1 wherein said lip movement responsive electrical signal has a maximum electrical amplitude during mouth open intervals of said user.

* * * * *